United States Patent
Matsumoto et al.

(10) Patent No.: US 9,132,760 B2
(45) Date of Patent: Sep. 15, 2015

(54) FRAME STRUCTURE FOR BACKREST AND METHOD FOR MANUFACTURING THE SAME

(75) Inventors: Satoshi Matsumoto, Nagoya (JP); Koji Yamaguchi, Nagoya (JP); Yoshito Kuroda, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/232,990

(22) PCT Filed: Jul. 9, 2012

(86) PCT No.: PCT/JP2012/067432
§ 371 (c)(1),
(2), (4) Date: Jan. 15, 2014

(87) PCT Pub. No.: WO2013/011852
PCT Pub. Date: Jan. 24, 2013

(65) Prior Publication Data
US 2014/0159462 A1    Jun. 12, 2014

(30) Foreign Application Priority Data
Jul. 15, 2011  (JP) .................................. 2011-156514

(51) Int. Cl.
*B60N 2/68* (2006.01)
*B29C 45/00* (2006.01)

(52) U.S. Cl.
CPC .............. *B60N 2/68* (2013.01); *B29C 45/0005* (2013.01); *B60N 2/686* (2013.01)

(58) Field of Classification Search
CPC ........... B60N 2/66; B60N 2/682; B60N 2/686
USPC ....................................... 297/452.18
See application file for complete search history.

(56) References Cited

U.S. PATENT DOCUMENTS

| | | | |
|---|---|---|---|
| 4,519,650 A * | 5/1985 | Terada et al. ............ | 297/452.18 |
| 4,685,739 A * | 8/1987 | Deegener et al. ........ | 297/452.65 |
| 4,804,226 A | 2/1989 | Schmale | |
| 5,040,848 A * | 8/1991 | Irie et al. .................. | 297/452.31 |
| 5,108,151 A * | 4/1992 | Peters et al. ............. | 297/452.18 |
| 5,810,446 A * | 9/1998 | Tadokoro .................. | 297/452.18 |
| 5,826,944 A | 10/1998 | Beneker et al. | |
| 6,386,638 B1 * | 5/2002 | Strauch .................... | 297/452.18 |
| 6,490,834 B1 * | 12/2002 | Dagher ..................... | 52/506.01 |

(Continued)

FOREIGN PATENT DOCUMENTS

| | | |
|---|---|---|
| JP | 49-133321 U | 11/1974 |
| JP | 59-35126 U | 3/1984 |

(Continued)

*Primary Examiner* — Peter Brown
(74) *Attorney, Agent, or Firm* — DLA Piper LLP (US)

(57) ABSTRACT

A frame structure for a backrest made of a resin and having a gate-shaped profile includes side frames extending parallel to each other on both sides thereof and a transverse frame extending like a sheet between top portions of the side frames integrally connected to the transverse frame, wherein the transverse frame connects to backrest back-side portions of the side frames at the top portions and connects to backrest front-side portions of the side frames at bottom portions, the transverse frame being formed into a sheet-like shape smoothly extending obliquely with respect to the side frames in a longitudinal cross section, and provided with reinforcing fibers extending continuously or intermittently at least between both side frames.

22 Claims, 5 Drawing Sheets

(56) References Cited

U.S. PATENT DOCUMENTS

| | | | |
|---|---|---|---|
| 6,591,949 B2 * | 7/2003 | Kitano et al. | 188/371 |
| 6,607,247 B2 * | 8/2003 | Becker et al. | 297/452.18 |
| 7,717,519 B2 * | 5/2010 | Kismarton et al. | 297/452.18 |
| 2008/0038569 A1 | 2/2008 | Evans et al. | |
| 2009/0211194 A1 * | 8/2009 | Fyfe et al. | 52/657 |

FOREIGN PATENT DOCUMENTS

| | | |
|---|---|---|
| JP | 63-28751 | 2/1988 |
| JP | 63-175956 U | 11/1988 |
| JP | 3-31339 U | 3/1991 |
| JP | 10-134 | 1/1998 |
| JP | 2000-270961 | 10/2000 |
| JP | 2001-269996 | 10/2001 |
| JP | 2005-194 | 1/2005 |
| JP | 2007-290585 | 11/2007 |
| JP | 2010-500198 | 1/2010 |
| JP | 2010-94436 | 4/2010 |
| JP | 2010-220748 | 10/2010 |

* cited by examiner

FRAME STRUCTURE FOR BACKREST AND METHOD FOR MANUFACTURING THE SAME

TECHNICAL FIELD

This disclosure relates to a frame structure for a backrest and its manufacturing method, and specifically relates to a frame structure suitable for a backrest of a car seat and its manufacturing method efficiently achieving a high stiffness while it is made of light resin.

BACKGROUND

A frame structure for a backrest, particularly a backrest of a vehicle seat, is expected to be lightweight to reduce the weight of a whole vehicle. Also, it is expected to have a high enough stiffness to properly protect passengers at the moment of a lateral or rear-end vehicle collision, in addition to being required to have an adjusting mechanism to adjust the backrest angle to rotate around a lower supporting point.

If such a frame structure is chiefly made of metal, the frame structure will have a comparatively complicated shape as disclosed in JP 2010-94436-A and, therefore, members of the frame will need to be bonded with many processes such as welding to meet the above-described demands. Besides, the structure chiefly made of metal cannot be greatly reduced in weight.

On the other hand, FRP (Fiber-Reinforced Plastic) is a lightweight and high stiffness material known as an alternative to metal, and some prototypes of frame structures for a backrest have been made of FRPs as disclosed in JP 2005-194-A, JP 2010-500198-A and JP 2010-220748-A. JP '194 discloses a structure in which convex upper reinforcing portions are formed integrally with both side ends of a plate-shaped framework. In such a structure, because the framework is made with a plate member extending to a broad area, the plate thickness of the framework has to be increased to improve the stiffness of the backrest. Therefore, the overall weight savings that can be achieved are limited. JP '198 discloses a structure in which frame parts (corresponding to Side Frames positioned in corresponding places of our structures) disposed on both left and right sides of the backrest structure have a significantly enhanced stiffness. However, because the stiffness of a frame part between the side frames (corresponding to Transverse Frame positioned in a corresponding place of our structures) has not been specifically improved, the stiffness of the backrest structure might be insufficient as a whole especially on the left and right sides. Such a structure disclosed in JP '198 in which many ribs are provided to improve the left and right frame parts in stiffness do not have an excellent formability. In addition, there is a great amount of material usage that causes unfavorable production costs. JP '748 discloses a frame manufactured through a burdensome process in which a mandrel on which a three-dimensional braiding has been formed is picked out, squeezed and impregnated with resin at the RTM process. Concerning conventional structures disclosed in JP '194, JP '198 and JP '748, there is room for improvement in efficiently producing a lightweight and high stiffness frame structure at cheaper prices with ease.

It could therefore be helpful to provide a frame structure and its manufacturing method at a cheaper price with ease, particularly by structurally improving a transverse frame as a portion extending between side frames on both sides, additionally, by allocating reinforcing fibers to improve the stiffness as efficiently achieving weight savings as a whole.

SUMMARY

We provide a frame structure for a backrest made of a resin and having a gate-shaped profile including side frames extending parallel to each other on both sides thereof and a transverse frame extending like a sheet between top portions of the side frames integrally connected to the transverse frame, wherein the transverse frame connects to backrest back-side portions of the side frames at the top portions and connects to backrest front-side portions of the side frames at bottom portions, the transverse frame being formed into a sheet-like shape smoothly extending obliquely with respect to the side frames in a longitudinal cross section, and provided with reinforcing fibers extending continuously or intermittently at least between both side frames.

We also provide the frame structure wherein the transverse frame has greater widths at sides of the side frames and has a smaller width at a center portion between both side frames.

We further provide the frame structure wherein a lower edge of the transverse frame is formed into an arch shape.

We further provide the frame structure wherein the side frames have a U-shaped cross section opening laterally outward.

We further provide the frame structure wherein the side frames are provided with connecting portions at lower ends to connect to a supporting portion to rotatably support the side frames.

We further provide the frame structure wherein a belt-shaped FRP sheet in which reinforcing fibers are unidirectionally-oriented is pasted on the transverse frame and a matrix resin of the FRP sheet and a resin constituting the transverse frame are integrally joined.

We further provide the frame structure wherein the FRP sheet is continuously or intermittently pasted at least on a portion of the transverse frame such that the reinforcing fibers extend from a center between both the side frames to a connecting portion between the transverse frame and the side frames on a front side.

We further provide the frame structure wherein the FRP sheet is continuously or intermittently pasted at least on a portion of the transverse frame such that the reinforcing fibers extend approximately in parallel in a width direction of the frame structure.

We further provide the frame structure wherein the FRP sheet is continuously or intermittently pasted at least on a portion of the transverse frame such that the reinforcing fibers extend in an oblique direction with respect to a width direction of the frame structure.

We further provide the frame structure wherein a belt-shaped FRP sheet in which the reinforcing fibers are unidirectionally-oriented is continuously or intermittently pasted at least on a portion of both the side frames and a matrix resin of the pasted FRP sheet and a resin constituting the side frames are integrally joined.

We further provide the frame structure wherein a belt-shaped FRP sheet in which the reinforcing fibers are unidirectionally-oriented is continuously or intermittently pasted at least on circumferences which include a connecting portion to the transverse frame and extend around from a backrest front side of the side frames to a backrest back side along the circumferences and the matrix resin of the pasted FRP sheet and the resin constituting the side frames are integrally joined.

We further provide the frame structure wherein the transverse frame has a reinforcing portion to support the transverse frame from a back side.

We further provide the frame structure wherein the reinforcing portion is a rib extending between the side frames.

We further provide the frame structure wherein the side frames are provided with a rib.

We further provide the frame structure wherein the reinforcing fibers in the belt-shaped FRP sheet are continuous fibers.

We further provide the frame structure wherein the FRP sheet is a prepreg sheet made by impregnating a sheet of the unidirectionally-oriented reinforcing fibers with a thermoplastic resin in advance.

We further provide the frame structure wherein the reinforcing fibers are carbon fibers.

We further provide the frame structure wherein the frame structure for the backrest is made of a thermoplastic resin.

We further provide the frame structure wherein an injection molding is applied with the thermoplastic resin.

We further provide the frame structure wherein the thermoplastic resin contains discontinuous reinforcing fibers.

We further provide the frame structure wherein the frame structure is applied to a vehicle seat.

We further provide a method of manufacturing the frame structure, including placing a belt-shaped FRP sheet in which reinforcing fibers are unidirectionally-oriented in a mold and injecting a resin to be formed integrally in the mold.

In the frame structure for the backrest and its manufacturing method, because the transverse frame which has been formed into a sheet-like shape extending obliquely connects to backrest back-side portions of both the side frames at the tops and connects to backrest front-side portions of both the side frames at the bottoms, the frame structure could be reduced in weight as a whole and the stiffness of the transverse frame could be enhanced. Also, a load transmission pathway can be formed desirably from the transverse frame to the side frames while the frame structure for the backrest could easily be formed integrally as a whole at a low cost.

EXPLANATION OF SYMBOLS 1, 21, 41, 51, 61: frame structure for backrest
2, 22, 52, 62: transverse frame
3, 23, 53, 63: side frame
4: connecting portion
5: arch shape
6: backrest back-side portion
7: backrest front-side portion
24a, 24b, 25a, 25b, 26a, 26b, 27a, 27b, 28a, 28b, 28c, 29, 30, 42a, 42b, 43, 52a, 52b, 53a, 53b, 54, 64: FRP sheet
31: rib
32: cross sectional structure
55, 65a, 65b: rib
56: reinforcing member

DETAILED DESCRIPTION

Our frame structures for backrests are made of a resin and have a gate-shaped profile consisting of side frames extending in parallel to each other on both sides and a transverse frame extending like a sheet between the tops of both the side frames integrally connected to the transverse frame, characterized in that the transverse frame connects to backrest back-side portions of both the side frames at the tops and connects to backrest front-side portions of both the side frames at the bottoms, the transverse frame being formed into a sheet-like shape smoothly extending obliquely with respect to the side frames in a longitudinal cross section, the transverse frame being provided with reinforcing fibers extending continuously or intermittently at least between both side frames.

In the frame structure for the backrest, since the transverse frame is formed as extending like a sheet between the tops of both the side frames integrally connected to the transverse frame, a gate-shaped lightweight frame structure for the backrest is formed. However, even if the transverse frame is formed into a sheet-like shape, the transverse frame may not greatly improve in stiffness. Accordingly, the transverse frame connects to backrest back-side portions of both the side frames at the tops and connects to backrest front-side portions of both the side frames at the bottoms, and the transverse frame is formed into a sheet-like shape smoothly extending obliquely with respect to the side frames in a longitudinal cross section. Because the side frames have more or less a certain width between its back side and front side of the backrest, the transverse frame formed into a sheet-like shape extends obliquely over the width so that the transverse frame has a calculated height of the second moment of area substantively corresponding to the oblique height in the cross sectional view and, therefore, the stiffness of the transverse frame can efficiently be enhanced with the effectively increased second moment of area in spite of its comparatively thin small sheet-like shape. The transverse frame receives a backrest load of passengers and transmits the load to both the side frames. The transverse frame is formed into the oblique sheet-like shape to be structurally improved in stiffness to sufficiently receive a high load. Additionally, it is provided with reinforcing fibers extending between both the side frames, so that the load transmission pathway from the transverse frame side to both the side frames sides is efficiently formed. Besides, because the transverse frame connects to the backrest back-side portions of both the side frames at the tops and connects to the backrest front-side portions of both the side frames at the bottoms, the load transmission pathway from the transverse frame side to the both side frames sides can be formed to transmit the load from the center of the transverse frame to the backrest front side to make a desirable load transmission pathway for the gate-shaped frame structure for the backrest in which the transverse frame is provided at the tops of both the side frames. Thus, a configuration can reduce the structure in weight as a whole, enhance the stiffness of the transverse stiffness and form a desirable load transmission pathway from the transverse frame side to both the side frames sides. Further, because the structure can be achieved by forming the transverse frame into a sheet-like shape as described above without complicated shapes and structures and because the amount of material usage can be reduced by employing the sheet-like structure, a lower cost as well as excellent productivity can be easily achieved.

It is preferable that the transverse frame has greater widths at sides of the side frames and has a smaller width at a center between both side frames. Such a configuration makes it possible that the load applied to the transverse frame is received appropriately and the load is transmitted to the side frames.

Above all, if a lower edge of the transverse frame is formed into an arch shape, the area of the transverse frame can be appropriately reduced and the stress concentration can be prevented to make the strength and stiffness of a whole the frame structure desirable.

Although the sectional structure of the side frames is not limited, it is possible that the side frames have a U-shaped cross section opening laterally outward, so that the FRP sheet extending along the circumference of the side frames can easily be pasted to effectively enhance the stiffness of the side frames with a simple sectional structure to achieve the improvement of the stiffness as well as the simplification of the forming and the production.

It is preferable that the side frames are provided with connecting portions at lower ends to connect to a supporting portion for rotatably supporting the side frames to make the backrest function to adjust angles and the like. Because the frame structure for the backrest is basically a resinous frame structure which can be integrally formed, such a connecting portion can easily be formed at the time of forming.

It is possible that a belt-shaped FRP sheet in which reinforcing fibers are unidirectionally-oriented is pasted on the transverse frame and a matrix resin of the FRP sheet and a resin constituting the transverse frame are integrally joined. In such a configuration, the belt-shaped FRP sheet is pasted on the transverse frame to be integrated so that the resinous transverse frame is properly reinforced to be high-stiffness as using the lightweight characteristics of the transverse frame. Because the FRP sheet is only pasted on the surface of the resinous frame before integrated, it is very easily positioned at a predetermined portion in producing the frame structure with ease. Also, it can be produced at a low cost because usage of the FRP sheets can be reduced from a structure of which frame sections are all made of FRP. As to the reinforcement by pasting the FRP sheet, because a thin FRP sheet is only pasted along the surface shape of the transverse frame, any unevenness structure, special rib structure or the like is not required on the portion which should be reinforced. Even from this aspect, the easier production can be achieved at a lower cost. Therefore, a lightweight frame structure for a backrest of which predetermined portion has a high stiffness can be produced easily at a low cost.

Further, in such a configuration to paste the FRP sheets, it is preferable that the FRP sheet is continuously or intermittently pasted at least on a portion of the transverse frame to make the reinforcing fibers extend from a center between both the side frames to a connecting portion between the transverse frame and the side frames on a front side. If the FRP sheet is pasted in such a way, the extending reinforcing fibers can efficiently form the transmission pathway of the load applied to the transverse frame to the side frames on the front side. Thus, the load can be transmitted efficiently from the transverse frame to the side frame sides by using a less amount of the FRP sheets or a less amount of the reinforcing fibers so that the weight saving and the high stiffness can be achieved more efficiently.

Further, it is preferable that the FRP sheet is continuously or intermittently pasted at least on a portion of the transverse frame to make the reinforcing fibers extend approximately in parallel in a width direction of the frame structure. Such a configuration can be applied together with the configuration of the FRP sheet in which reinforcing fibers extend from the center between both the side frames to the connecting portion between the transverse frame and the side frames on the front side. If the reinforcing fibers are positioned to extend approximately in parallel in the width direction of the frame structure, the stiffness of the gate-shaped frame structure can be enhanced as a whole by an enhanced stiffness against the bending deformation with passengers' backrest load as well as an enhanced connection strength of the transverse frame between both the side frames.

Further, it is preferable that the FRP sheet is continuously or intermittently pasted at least on a portion of the transverse frame to make the reinforcing fibers extend in an oblique direction with respect to a width direction of the frame structure. For example, it is even preferable that the FRP sheet is continuously or intermittently pasted at least on a portion of the transverse frame to make the reinforcing fibers extend obliquely upward from sides of the side frames toward a center of the transverse frame. If the FRP sheet is pasted in such a way, the extending reinforcing fibers can efficiently form the transmission pathway of the load applied to the transverse frame to the side frames sides. Thus, the load can be transmitted efficiently from the transverse frame to the side frames sides so that a more desirable load transmission pathway can be formed. Therefore, the stiffness of the transverse frame can be enhanced by using the FRP sheets efficiently.

Also, it is preferable that a belt-shaped FRP sheet in which the reinforcing fibers are unidirectionally-oriented is continuously or intermittently pasted at least on a portion of both the side frames and the matrix resin of the pasted FRP sheet and the resin constituting the side frames are integrally joined. In such a configuration, the bending deformation of the side frames caused by a lateral load applied in the width direction of the frame structure can be efficiently suppressed while the stiffness of the side frames can be easily enhanced efficiently so that the stiffness of the frame structure as a whole is enhanced desirably.

Where to paste the FRP sheet on both the side frames can be selected appropriately. Specifically, if a belt-shaped FRP sheet in which the reinforcing fibers are unidirectionally-oriented is continuously or intermittently pasted at least on circumferences which include a connecting portion to the transverse frame and extend around from a backrest front side of both the side frames to a backrest back side along the circumferences while the matrix resin of the pasted FRP sheet and the resin constituting the side frames are integrally joined, the bending stiffness of the side frames in the front-back direction can efficiently be enhanced. Further, if such a configuration is combined with the configuration of the FRP sheet extending from the center between both the side frames to the connecting portion of the side frames on the front side, the load transmission pathway can be formed from the side frames to the transverse frame to enhance the stiffness of the frame structure.

It is possible that the transverse frame has a reinforcing portion to support the transverse frame from a back side. Even such a reinforcing portion can easily be formed integrally when a whole frame structure is formed. The reinforcing portion will appropriately enhance the strength and stiffness of the transverse frame, and even the strength and stiffness of a whole frame structure can be enhanced appropriately.

The shape of the reinforcing portion is not limited and may be formed into a rib extending between the side frames. Such a reinforcing portion may extend over a broad span of the transverse frame and, alternatively, may locally exist within a narrow span.

Although the side frames are preferably formed into a shape as simple as possible from a viewpoint of integrally forming the frame structure as a whole, it is possible that the side frames are provided with a rib to reinforce the side frames themselves.

It is preferable that the reinforcing fibers in the belt-shaped FRP sheet are continuous fibers. Because the pasted FRP sheets can reinforce at least a predetermined portion of the transverse frame and form a desirable transmission pathway of a load from the transverse frame side to the side frames sides, it is preferable that the reinforcing fibers of the FRP sheet are made from continuous fibers so that the reinforcement is efficiently achieved and the load transmission pathway is efficiently formed. It is ideal that a comparatively long FRP sheet is pasted on the frame structure from a viewpoint of maintaining the continuity of stress acting on the reinforcing fibers. However, in a case that it is difficult for a sheet to be pasted on a complicated curved surface or the like, it is possible that a plurality of short FRP sheets such as sheets whose ends overlap each other, are intermittently pasted with small distances to make the fibers continuous. Alternatively, it is possible that the folded sheet of which a part is cut is pasted.

Although the above-described belt-shaped FRP sheet to be pasted is not limited, if the FRP sheet is a prepreg sheet made by impregnating a sheet of the unidirectionally-oriented reinforcing fibers with a thermoplastic resin in advance, the sheet can easily be pasted on a target place at the time of forming. More concretely, the positioning in the mold for pasting at the time of integral molding can be performed more easily so that a desirable forming can be achieved more easily.

The reinforcing fibers may be carbon fibers, glass fibers, aramid fibers, mixtures of such fibers or the like. Above all, it is preferable that the reinforcing fibers are carbon fibers so that the excellent strength and improved stiffness as well as excellent formability are achieved. The carbon fibers make it easy to design a target structure.

It is preferable that the frame structure for the backrest is made of a thermoplastic resin. Although it is even possible that it is made of a thermosetting resin, the thermoplastic resin is better with respect to good formability. Particularly, if an injection molding method is applied with the thermoplastic resin, desirable frame structure for the backrest can be mass-produced at a high productivity.

It is possible that the thermoplastic resin contains discontinuous reinforcing fibers. Such a configuration can allow the frame structure for the backrest to be produced with more strength and higher stiffness.

The frame structure for the backrest is applicable to all seats. It is suitable as a vehicle seat such as car seat, which is highly required to be lightweight with a high-stiffness and advanced productivity.

A manufacturing method of a frame structure for a backrest is characterized in that a belt-shaped FRP sheet in which reinforcing fibers are unidirectionally-oriented is placed in a mold and a resin is injected to be formed integrally in the mold. Although there is an alternative that the FRP sheet is pasted on a formed resin frame and then heated to be integrated, it is preferable that a prepared belt-shaped FRP sheet is placed at a predetermined position and integrated with the injected resin, specifically to make the transverse frame extend obliquely in a predetermined way so that a high-quality frame structure for the backrest is produced efficiently at a high productivity.

Figure 1:
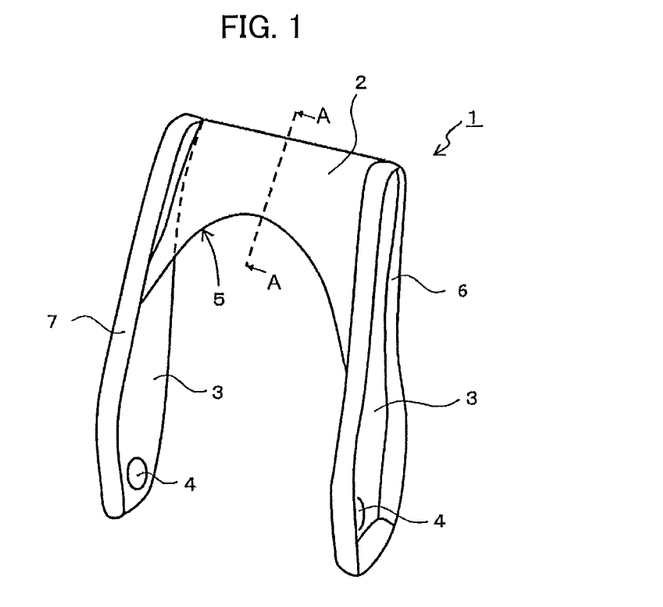
FIG. 1 is a schematic perspective view of a frame structure for a backrest according to an example.
Figure 2:
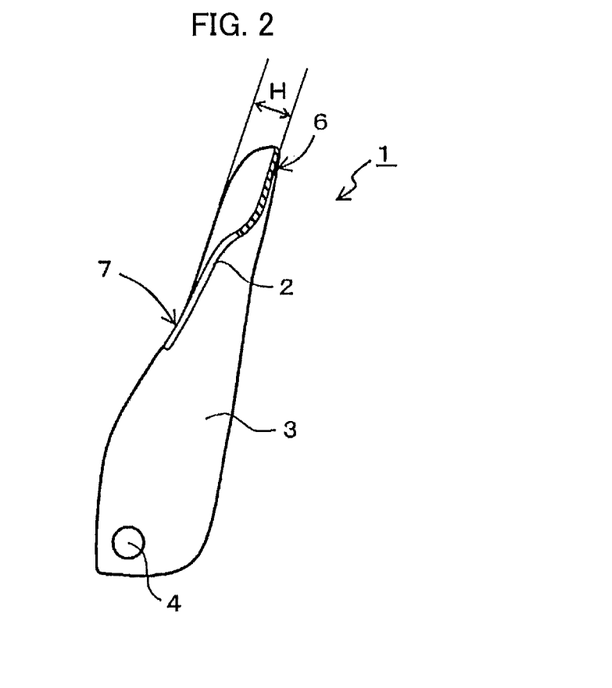
FIG. 2 is a schematic longitudinal sectional view of the frame structure in FIG. 1 along the A-A line.

Hereinafter, desirable examples will be explained with reference to the Figs. FIGS. 1 and 2 show frame structure 1 for a backrest according to an example. Frame structure 1 for a backrest is configured to be a gate-shaped resinous frame structure for a backrest of vehicle seats in which side frames 3 that extend parallel to each other on both sides and transverse frame 2 that extends between the tops of both the side frames are integrally connected. Both side frames 3 are provided with connecting portions 4 (holes) at the lower ends to connect to a supporting portion (provided on the vehicle seats, not shown) to rotatably support side frames 3. In this example, transverse frame 2 is configured to have a width direction corresponding to the direction in which side frames 3 extends. It has a greater width at the sides of side frames 3 and has a smaller width at the center of both side frames 3, as shaping arch shape 5 with the lower edge.

Transverse frame 2 connects to backrest back-side portions 6 of both side frames 3 at the top and connects to backrest front-side portions 7 of both side frames 3 at the bottom, as being formed into a sheet-like shape smoothly extending obliquely with respect to side frames 3 in the longitudinal cross section shown in FIG. 2. Transverse frame 2 is provided with reinforcing fibers such as carbon fibers extending continuously or intermittently at least between both side frames 3.

In gate-shaped resinous frame structure for a backrest 1, since transverse frame 2 is formed into a sheet-like shape having a comparatively small thickness, the weight of the frame structure is reduced as a whole. Transverse frame 2 is formed into a sheet-like shape smoothly extending obliquely with respect to both side frames 3 as connected to backrest back-side portions 6 of both side frames 3 at the top and connected to backrest front-side portions 7 of both side frames 3 at the bottom so that the cross section of oblique transverse frame 2 has height H corresponding to the width between the backrest back-side portion and the backrest front-side portion at the top of side frames 3 in the cross sectional view of transverse frame 2 shown in FIG. 2. Because height H substantively corresponds to a calculated height of the second moment of area of the transverse frame, the stiffness of transverse frame 2 can efficiently be enhanced with the effectively increased second moment of area in spite of its comparatively thin small sheet-like shape. Transverse frame 2 is provided with reinforcing fibers which continuously or intermittently extend at least between both side frames 3. Transverse frame 2, which receives a backrest load of passengers and transmits the load to both the side frames 3, is formed into an oblique sheet-like shape and provided with reinforcing fibers extending between both side frames 3. Therefore, transverse frame 2 is structurally and materially improved in stiffness to sufficiently receive a high load, and a load transmission pathway from transverse frame 2 side to both side frames 3 sides, specifically to backrest front-side portions 7 of both side frames 3, is efficiently formed. Such gate-shaped frame structure 1 for a backrest can be formed integrally as a whole and easily be produced with an excellent productivity. In this example, because transverse frame 2 has an arch-like lower edge, transverse frame 2 has a small surface area to reduce weight and has a shape capable of preventing the stress from concentrating so that frame structure 1 has been further reduced in weight as a whole.

Figure 3:
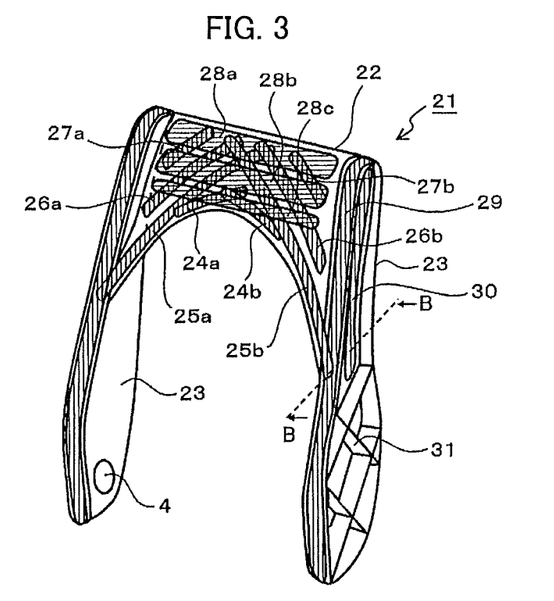
FIG. 3 is a schematic perspective view of a frame structure for a backrest according to another example.

The reinforcing fibers can be put on the transverse frame or side frames by pasting the belt-shaped FRP sheet in which reinforcing fibers are unidirectionally oriented. FIG. 3 shows that frame structure 21 for a backrest is a gate-shaped frame structure which consists of transverse frame 22 and both side frames 23 having a U-shaped cross section opening laterally outwardly. The cross sectional structure will be explained later with reference to FIG. 6. Frame structure 21 for a backrest is pasted with a plurality of belt-shaped FRP sheets in which reinforcing fibers such as carbon fibers are unidirectionally oriented. Transverse frame 22 is pasted with a plurality of FRP sheets 24a, 24b, 25a, 25b, 26a, 26b, 27a and 27b, wherein some FRP sheets are pasted as crossing other FRP sheets while other FRP sheets connect to each other with the top ends. Also, a plurality of FRP sheets 28a, 28b and 28c extending along the width direction of frame structure 21 are pasted at intervals. Transverse frame 22 can surely be reinforced greatly by being pasted with such a plurality of FRP sheets appropriately. In this example, FRP sheets 29 are pasted along the circumferential surfaces of side frames 23 having a U-shaped cross section while FRP sheets 30 are pasted on the outer lateral surfaces of side frames 23. Although FIG. 3 shows the FRP sheets pasted only on the front side of the frame structure of transverse frame 22 and the lateral side of side frames 23, they can be pasted alternatively on the back side of transverse frame 22 or the inner lateral side of side frames 23. In this example, side frames 23 are reinforced as a whole with ribs 32 which are formed integrally on the laterally outer surfaces at the bottom of side frames as crossing to each other. Other aspects of configuration and mechanism are pursuant to the examples shown in FIGS. 1 and 2.

Figure 4:
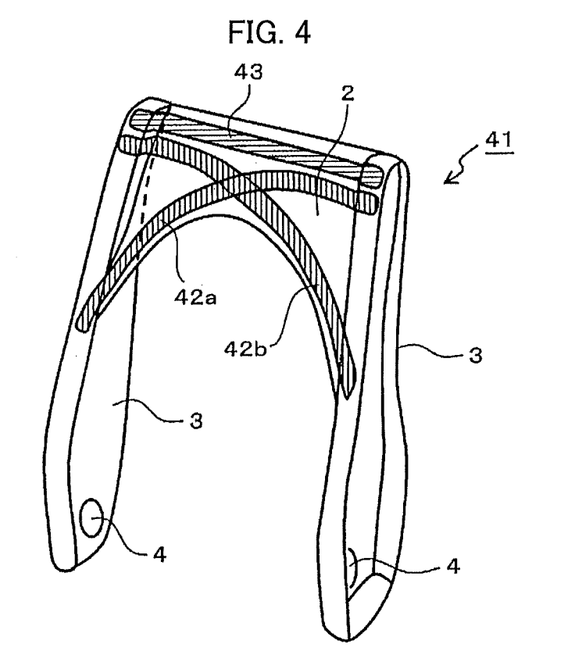
FIG. 4 is a schematic perspective view of a frame structure for a backrest according to yet another example.

In frame structure 41 for a backrest shown in FIG. 4, belt-shaped FRP sheets 42a and 42b extending obliquely upward from side frames 3 extends via the center of transverse frame 2 to the opposite side of each side frame 3. Even FRP sheet 43 is pasted between both side frames 3 in the width direction of frame structure 41. In this example, the stiffness of transverse frame 2 has been efficiently enhanced with a small number of comparatively long-shaped FRP sheets 41a and 42b. Other aspects of configuration and mechanism are pursuant to the examples shown in FIGS. 1 to 3.

Figure 5:
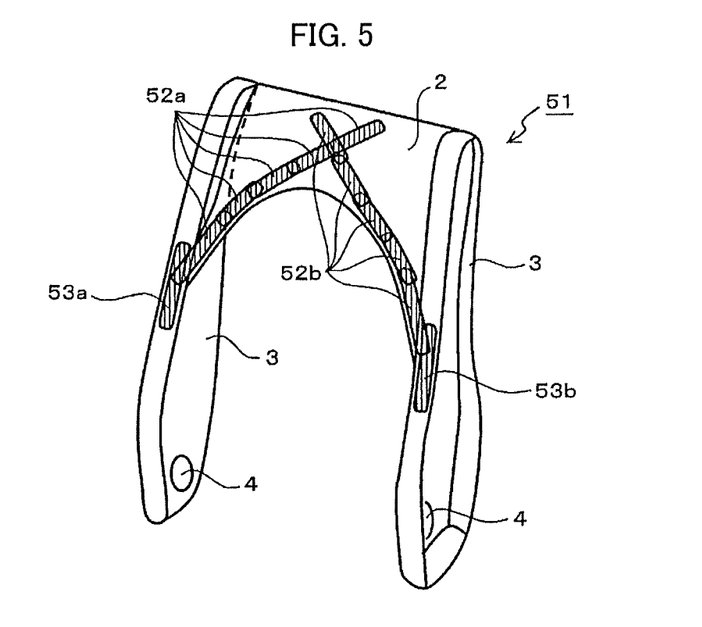
FIG. 5 is a schematic perspective view of a frame structure for a backrest according to yet another example.

In frame structure 51 for a backrest shown in FIG. 5, a plurality of shorter FRP sheets 52a and 52b are pasted while the FRP sheets pasted on transverse frame 2 extend obliquely upward from the left and right side frames 3. The reinforcing fibers positioned by pasting each FRP sheet 52a and 52b may extend in effect intermittently, and each of FRP sheets 52a and 52b can be pasted close to each other to achieve a sufficiently great reinforcing effect. If FRP sheets 52a and 52b are formed into a short shape each, each of FRP sheets 52a and 52b can easily be pasted on predetermined portions. Even if portions where the FRP sheets are to be pasted have curved or bent shape, it will work with such a shape. In FIG. 5, short FRP sheets 52a and 53b are pasted on the front side arm portion of the cross section of each side frame 3, specifically even at the connecting portion to FRP sheets 52a and 52b. In such a configuration, a load transmission pathway from the side of transverse frame 2 to the side of side frames 3 can be formed more surely to transmit the load more surely. Other aspects of configuration and mechanism are pursuant to the examples shown in FIGS. 1 to 3.

Figure 6:
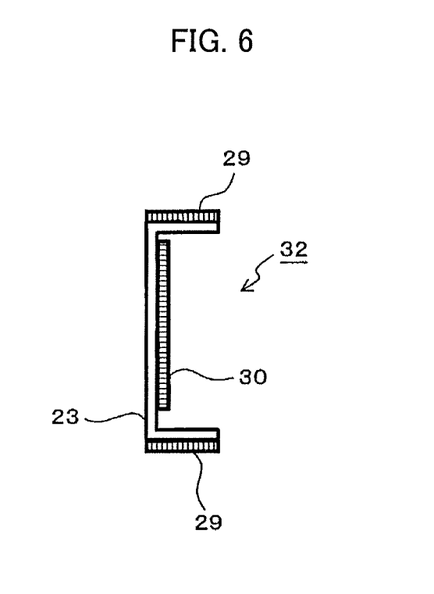
FIG. 6 is a schematic longitudinal cross sectional view of the frame structure in FIG. 3 along the B-B line.

It is preferable that the side frames have a U-shaped cross section opening laterally outward. FIG. 6 shows cross section structure 32 viewed along the B-B line of side frame 23 of frame structure 21 for backrest in FIG. 3. FRP sheets 29 are pasted on the outer circumferential surfaces at U-shaped arm parts of side frames 23 having the U-shaped cross section while FRP sheets 30 are pasted on the outer lateral surfaces at the bottom side of the U-shaped cross section. Such a structure can be reinforced without complicated unevenness and ribs crossing to each other or the like on side frames 23. It is easy to be formed because the mold can be opened laterally outward as well.

Figure 7:
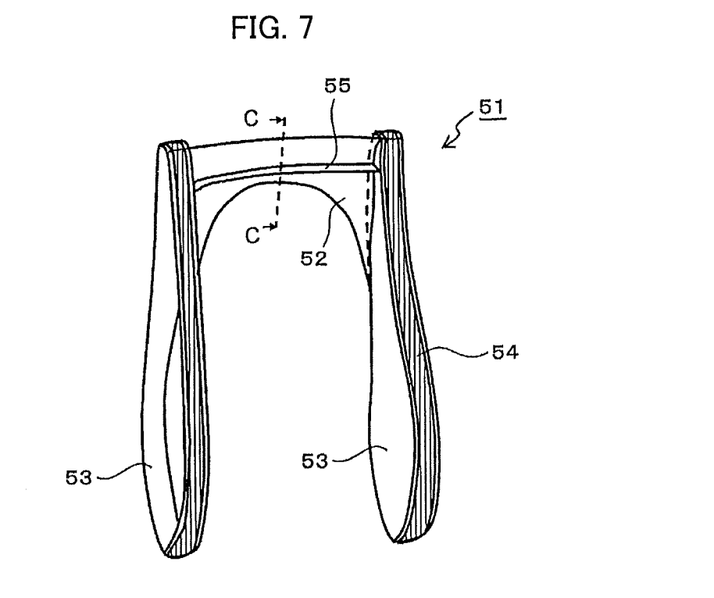
FIG. 7 is a schematic perspective view of a frame structure for a backrest viewed from a backside according to yet another example.
Figure 8:
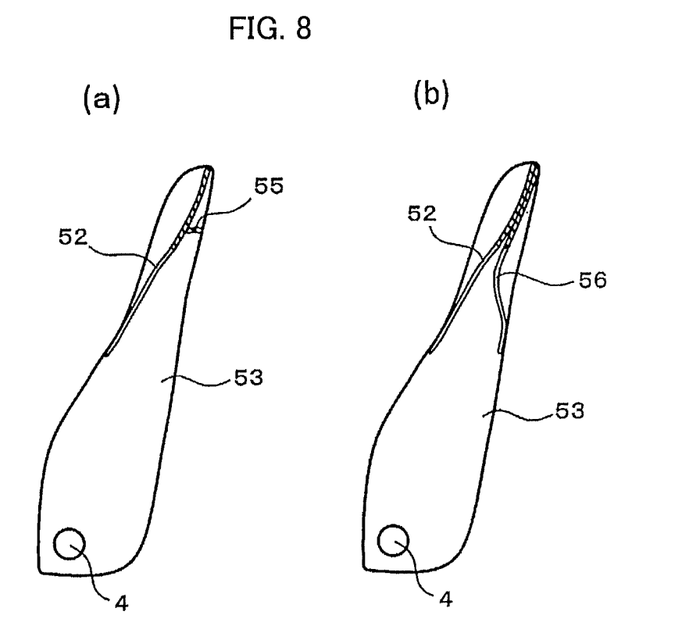
FIG. 8 is a sectional view of the frame structure in FIG. 7 along the C-C line, where (a) and (b) are each individual examples of configurations of reinforcing transverse frame.

To reinforce the transverse frame further appropriately in terms of structure, it is possible that the transverse frame is provided with a reinforcing portion capable of supporting the transverse frame from the back side. FIG. 7 shows frame structure 51 for a backrest viewed from the back side, in which frame structure 51 for backrest comprises transverse frame 52 and left and right side frames 53 (depicted as side frames 53 pasted with FRP sheets 54 on the circumferential surface) while transverse frame 52 is provided with rib 55 as a reinforcing portion standing up from the back side. Rib 55 extends over the left and right side frames 53, and it is formed into a shape extending backward from the back side of transverse frame 52 as shown in FIG. 8 (*a*). Such a structure of the reinforcing portion capable of supporting transverse frame 52 from the back side can be achieved in various ways. As shown in FIG. 8 (*b*), it is possible that transverse frame 52 is further provided on the back side with reinforcing member 56 which is preferably integral with the back side and has a sheet-like shape to make a double shell structure. Such a reinforcing structure may be made of an injected resin to make a frame structure by injection molding and, alternatively, may be preformed individually and then molded integrally in the mold.

Figure 9:
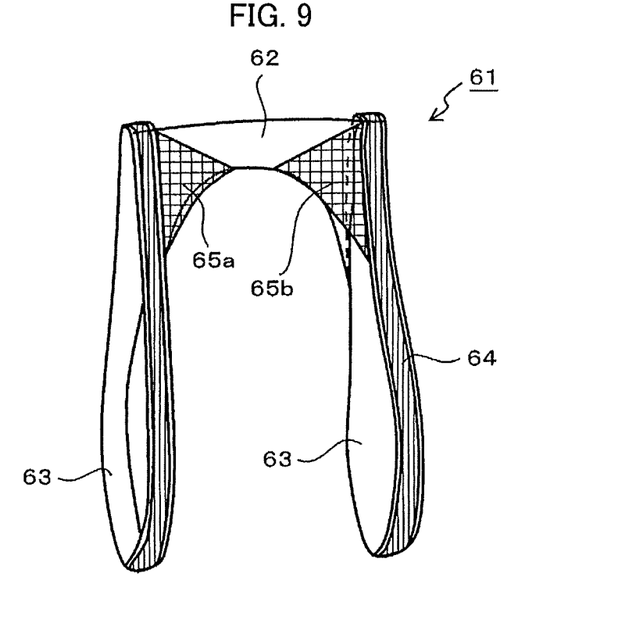
FIG. 9 is a schematic perspective view of a frame structure for a backrest viewed from a backside according to yet another configuration of a reinforcing transverse frame.

The reinforcing portion may be provided locally at appropriate positions, other than the above-described configuration extending over the span between the left and right side frames. FIG. 9 shows frame structure 61 for a backrest viewed from the back side, where ribs 65a and 65b as reinforcing portions extending obliquely toward the back side of each side frame 63 (depicted as side frame 63 pasted with FRP sheet 64 on the circumferential surface) are provided only at both left and right sides of transverse frame 62 on the back side of transverse frame 62. Such ribs 65a and 65b like props can support transverse frames 62 from the back side against each back side of each side frame 63 so that the stiffness of transverse frame 62 is efficiently enhanced and the stiffness of the gate-shaped frame structure 61 for backrest is efficiently enhanced as a whole. Thus, the transverse frame can be reinforced in various ways.

INDUSTRIAL APPLICATIONS

The frame structure for a backrest and a method of manufacturing the same is applicable to all seats expected to be lightweight specifically and is suitable as a vehicle seat.

The invention claimed is:
1. A frame structure for a backrest, made of a resin and having a gate-shaped profile comprising side frames extending parallel to each other on both sides thereof and a transverse frame extending like a sheet between top portions of the side frames integrally connected to the transverse frame, wherein the transverse frame connects to backrest back-side portions of the side frames at the top portions and connects to backrest front-side portions of the side frames at bottom portions,
said transverse frame being formed into a sheet-like shape smoothly extending obliquely with respect to the side frames in a longitudinal cross section, and
provided with reinforcing fibers extending continuously or intermittently at least between both side frames.

2. The frame structure according to claim 1, wherein the transverse frame has greater widths at sides of the side frames and has a smaller width at a center portion between both side frames.

3. The frame structure according to claim 2, wherein a lower edge of the transverse frame is formed into an arch shape.

4. The frame structure according to claim 1, wherein the side frames have a U-shaped cross section opening laterally outward.

5. The frame structure according to claim 1, wherein the side frames are provided with connecting portions at lower ends to connect to a supporting portion to rotatably support the side frames.

6. The frame structure according to claim 1, wherein a belt-shaped FRP sheet in which reinforcing fibers are unidirectionally-oriented is pasted on the transverse frame and a matrix resin of the FRP sheet and a resin constituting the transverse frame are integrally joined.

7. The frame structure according to claim 6, wherein the FRP sheet is continuously or intermittently pasted at least on a portion of the transverse frame such that the reinforcing fibers extend from a center between both the side frames to a connecting portion between the transverse frame and the side frames on a front side.

8. The frame structure according to claim 6, wherein the FRP sheet is continuously or intermittently pasted at least on a portion of the transverse frame such that the reinforcing fibers extend approximately in parallel in a width direction of the frame structure.

9. The frame structure according to claim 6, wherein the FRP sheet is continuously or intermittently pasted at least on a portion of the transverse frame such that the reinforcing fibers extend in an oblique direction with respect to a width direction of the frame structure.

10. The frame structure according to claim 6, wherein the reinforcing fibers in the belt-shaped FRP sheet are continuous fibers.

11. The frame structure according to claim 6, wherein the FRP sheet is a prepreg sheet made by impregnating a sheet of the unidirectionally-oriented reinforcing fibers with a thermoplastic resin in advance.

12. The frame structure according to claim 1, wherein a belt-shaped FRP sheet in which the reinforcing fibers are unidirectionally-oriented is continuously or intermittently pasted at least on a portion of both the side frames and a matrix resin of the pasted FRP sheet and a resin constituting the side frames are integrally joined.

13. The frame structure according to claim 1, wherein a belt-shaped FRP sheet in which the reinforcing fibers are unidirectionally-oriented is continuously or intermittently pasted at least on circumferences which include a connecting portion to the transverse frame and extend around from a backrest front side of the side frames to a backrest back side along the circumferences and the matrix resin of the pasted FRP sheet and the resin constituting the side frames are integrally joined.

14. The frame structure according to claim 1, wherein the transverse frame has a reinforcing portion to support the transverse frame from a back side.

15. The frame structure for the backrest according to claim 14, wherein the reinforcing portion is a rib extending between the side frames.

16. The frame structure according to claim 1, wherein the side frames are provided with a rib.

17. The frame structure according to claim 1, wherein the reinforcing fibers are carbon fibers.

18. The frame structure according to claim 1, wherein the frame structure for the backrest is made of a thermoplastic resin.

19. The frame structure according to claim 18, wherein an injection molding is applied with the thermoplastic resin.

20. The frame structure according to claim 18, wherein the thermoplastic resin contains discontinuous reinforcing fibers.

21. The frame structure according to claim 1, wherein the frame structure is applied to a vehicle seat.

22. A method of manufacturing the frame structure according to claim 1, comprising placing a belt-shaped FRP sheet in which reinforcing fibers are unidirectionally-oriented in a mold and injecting a resin to be formed integrally in the mold.

* * * * *